June 16, 1964    B. A. PEARL ETAL    3,137,064
MEANS FOR APPLYING END SEALS TO ELECTRIC CABLES
Filed Aug. 2, 1961    2 Sheets-Sheet 1
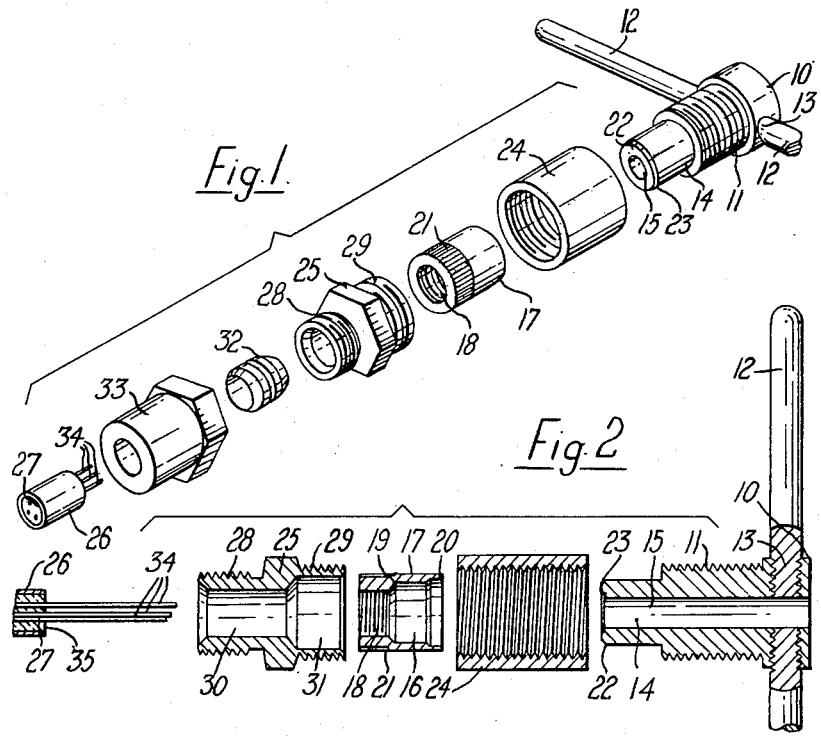
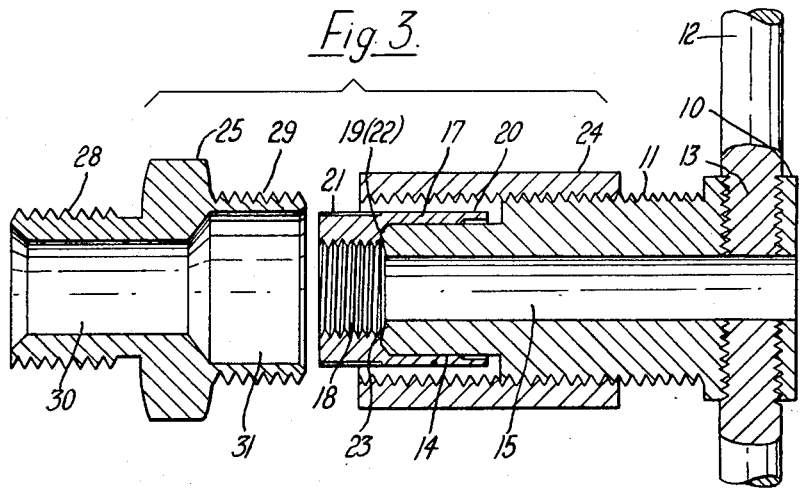
Bertram A. Pearl
Edward Newman    Inventors
By
Wenderoth, Lind & Ponack
Attorneys

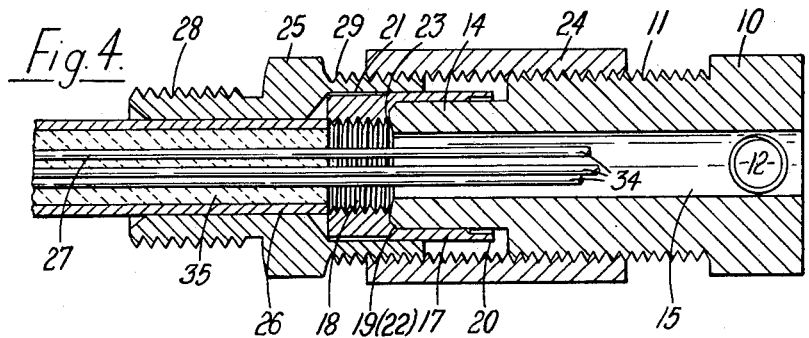
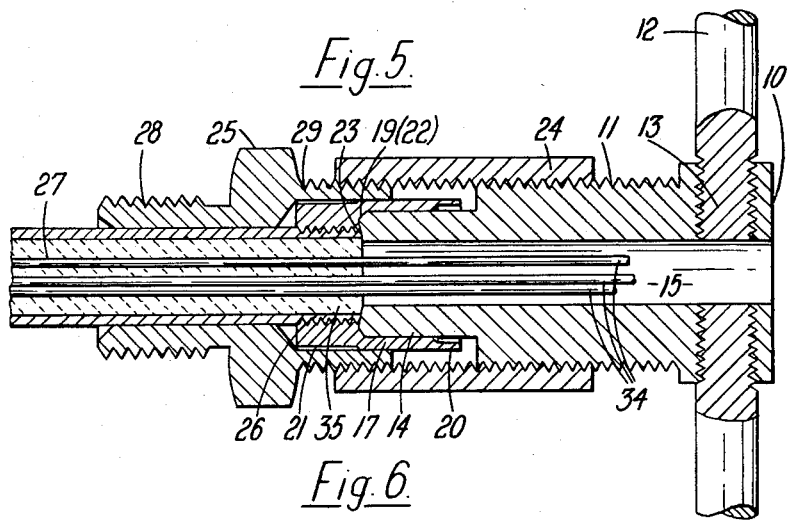
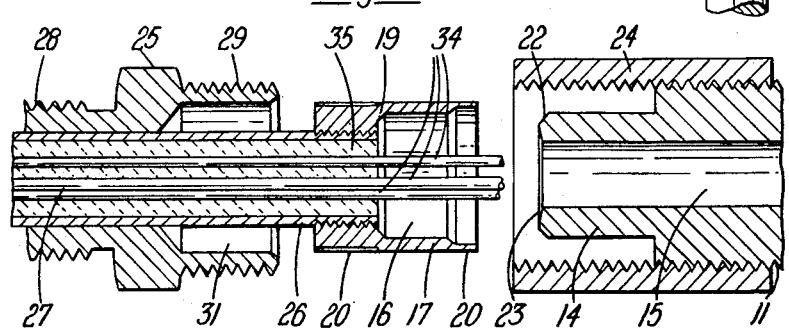

3,137,064
MEANS FOR APPLYING END SEALS TO ELECTRIC CABLES
Bertram Altson Pearl, Caulfield, Victoria, Australia, and Edward Newman, Glasgow, Scotland, assignors to Pyrotenax Limited, Hebburn-on-Tyne, England, a company of Great Britain
Filed Aug. 2, 1961, Ser. No. 128,804
Claims priority, application Australia Aug. 3, 1960
5 Claims. (Cl. 29—270)

This invention relates to means for applying an end seal to an electric cable and more particularly to a tool for assisting in the application of a sealing pot of the so-called screw-on type to a metal sheathed cable, for example metal sheathed mineral insulated electric cable.

The invention has for its object to provide an improved tool for the above mentioned purpose which enables a sealing pot to be readily and conveniently applied to a metal sheathed cable in a quick and efficient manner, and whereby the disadvantages of existing tools for this purpose which often cause mechanical damage to the sealing pot in application thereof are substantially avoided.

The tool for assisting in the application of a sealing pot to a metal sheathed cable according to the present invention comprises a tool body, means for enabling the tool body to be rotated, a probe or extension on the tool body which during attachment of the sealing pot to the cable co-operates with the sealing pot to engage an abutment thereon, and a sleeve on the tool body which during attachment fits over the sealing pot to permit attachment to such sleeve of a gland body disposed over the end of the cable.

If desired the sleeve may be rigidly attached to or integrally formed with the tool body but preferably, more especially for ease and economy in manufacture, such sleeve and such tool body are secured in screwthreaded engagement with one another and the sleeve is also provided with a screwthread for attaching such sleeve to the gland body.

Conveniently at least a part of the end face of the probe or extension is tapered at an angle corresponding to that of an internal shoulder on the sealing pot constituting the abutment with which such probe or extension engages. Such internal shoulder on the sealing pot may conveniently be formed by the internal enlargement of a portion of the sealing pot which is subsequently to receive a sealing compound. The base portion of the sealing pot will usually be internally screwthreaded to enable it to be screwed on to the cable sheath. For example, such sealing pot may be of the well known kind having a thin walled cup portion which is to receive the sealing compound, a thick walled base portion which is to be screwed to the cable sheath and an internal shoulder between such portions, the probe or extension on the tool body fitting rotatably within the cup portion of the sealing pot to engage the internal shoulder thereon during attachment.

Preferably during attachment the sealing pot is clamped between the end of the probe or extension and an internal shoulder on the gland body. The tool may conveniently be employed in association with a standard gland body of the kind having an externally screwthreaded tubular portion in which the sealing pot may be partly accommodated and to which the sleeve on the tool body may be screwed.

The tool body including the probe or extension thereon is preferably formed with a central hole sufficiently large to permit the cable conductor or conductors to pass therethrough but not sufficiently large to permit passage of the cable sheath. Since the tool may be used with a variety of cables with which a given size of sealing pot is used, such central hole will generally be large enough to receive the largest group of conductors employed in cables receiving a sealing pot of such size but not large enough to permit the passage through the hole of any of the cable sheaths.

The above described tool is especially useful for assisting in the application of a sealing pot to a metal sheathed mineral insulated cable and more especially in a tool for this purpose the end face of the probe or extension which engages the end of the cable sheath during the final stage of attachment is reflexed or reversely tapered at its inner portion.

The invention may be carried into practice in various ways and a preferred practical arrangement of the tool according thereto will now be described by way of example with reference to the accompanying drawings in which:

FIGURE 1 is an exploded perspective view of the preferred tool and of the elements used in association therewith, FIGURE 2 is a view in sectional elevation of the tool shown in FIGURE 1, FIGURE 3 is a view in sectional elevation to an enlarged scale and showing the probe or extension fitted within the sealing pot, FIGURE 4 is a view in sectional elevation at right angles to the section of FIGURE 3 showing the positions of the tool and elements associated therewith at the commencement of application of the sealing pot to the cable, FIGURE 5 is a view in sectional elevation at right angles to the section of FIGURE 4 showing the positions of the tool and elements associated therewith after the sealing pot has been screw fitted to the cable, and FIGURE 6 is a view in sectional elevation showing the removal of the tool after application of the sealing pot to the cable.

The preferred construction of the tool comprises a tool body 10 of cylindrical shaped provided with an external screwthread 11. A pair of removable handles 12 are provided for the purpose of imparting rotation to the body 10, the inner ends of such handles 12 being screwthreaded to engage in diametrically opposite screwthreaded holes formed in the tool body 10 adjacent to one end thereof.

A cylindrical probe or extension 14 is integrally formed with the tool body 10 at the end thereof remote from the handles 12, such probe or extension being of smaller external diameter than the body 10. A central hole or bore 15 extends axially through the body 10 and probe 14.

The external cylindrical surface of the probe 14 is of such diameter that it will fit closely but rotatably within the internally enlarged thin walled cup portion 16 of a sealing pot 17 of the well known screw-on kind. Thus the sealing pot 17 is provided with an internal screwthreaded base portion 18 formed integrally with the cup portion 16, the internal diameter of the cup portion 16 being greater than that of the base portion 18, and a tapering internal shoulder 19 formed between such cup portion 16 and such base portion 18. The internal diameter of the cup portion 16 is further enlarged near the free end thereof as shown at 20. The external surface of the base portion 18 of the sealing pot 17 is knurled as indicated at 21.

The end of the probe or extension 14 is formed at its free end with a tapered face 22 which is shaped to engage the tapered shoulder 19 on the sealing pot 17 when such probe or extension 14 is fitted within such pot, the angle of taper of such tapered face 22 being the same as that of the tapered shoulder 19. The annular end face of the probe or extension 14 between the tapered face 22 and the periphery of the bore 15 is reflexed at a shallow angle as shown at 23. An internally screwthreaded cylindrical sleeve 24 is tightly screwthreaded to the tool body 10 and extends over the probe 14, the internal diameter of such sleeve 24 being sufficiently greater than the external diameter of the probe or extension 14 to allow the sealing pot 17 to extend freely between them and to provide a cylindrical space around such pot (see FIGURE 3).

A gland body 25 fits over the sheath 26 of the cable 27, such gland body being formed with an externally screwthreaded portion 28 and an externally screwthreaded portion 29 of increased diameter. A bore 30 is formed axially in the portion 28 and communicates with an enlarged bore 31 in the portion 29.

The sealing pot 17 in use fits within the bore 31 and the sleeve 24 in use is screwed to the portion 29 of such gland body 25. The central portion of the gland body 25 is conveniently of hexagonal section.

A compression ring 32 fits over the cable 27 and a gland nut 33 is screwthreaded to the portion 28 of the gland body 25. It will be appreciated that the gland body 25, compression ring 32 and gland nut 33 are standard fittings for electric cables but it will be understood that these may if desired be replaced by an externally screwthreaded sleeve or the like to which the sleeve 24 may be screwed.

In operation the gland nut 33 and compression ring 32 are passed over the end of the cable 27 from which a section of sheath 26 has previously been removed, for example by means of a sheath stripping tool. The screw-on sealing pot 17 is placed in position on the probe or extension 14 and within the sleeve 24, the latter having been screwed to the tool body 10 (see FIGURE 3). The tapered end face 19 of the probe or extension 14 engages the tapered internal shoulder 22 on the sealing pot 17 and the gland body 25 is then screwed into the sleeve 24 so as to clamp the sealing pot 17 between the probe or extension 14 and the base of the recess 31 in the gland body 25. The gland body 25 is screwed into the sleeve 24 only to finger tightness.

The assembly of the tool body 10, sleeve 24, sealing pot 17 and gland body 25 are then passed over the exposed conductors 34 of the partially stripped cable 27 so that such conductors 34 pass through the aligned central holes in such elements until the cable sheath 26 enters the gland body 25 and engages the base of the sealing pot 17 as shown in FIGURE 4.

The tool body 10 is then turned in a clockwise direction by means of the handles 12 while simultaneously light pressure is applied against the cable 27 so as to cause the internal screwthread of the sealing pot 17 to engage and cut threads in the sheath 26 of the cable 27. The rotation of the tool is continued until a considerable increase in resistance to the rotation of the tool is experienced, which indicates that the sealing pot 17 has been screwed fully on to the cable sheath 26 (as indicated in FIGURE 5) and that the end of the sheath 26 has met the end of the probe or extension 14. It will thus be appreciated that the operator is given an indication that the sealing pot 17 has been screwed fully on to the cable 27 and at the same time the risk of screwing the sealing pot 17 too far on to the cable 27 is minimised.

At this stage the reflexed or angularly tapered face 23 on the end of the probe or extension 14 engages the end of the metal sheath and forms a slightly tapered end face on such sheath. The reflex angle of such tapered face 23 of the probe or extension 14 ensures that the mineral filling 35 of the cable 27 is not damaged by the engagement of such probe or extension 14 with such cable 27 and that the insulating properties of the cable are not detrimentally affected by the application of the sealing pot.

The tool body and sleeve are then rotated manually in an anti-clockwise direction to enable the sleeve 24 to be removed from the gland body. This permits removal of the tool leaving the sealing pot 17 in its correct position and in correct alignment on the cable sheath 26. The cable is now ready for completion of sealing in the well known manner by screwing the gland nut 33 to the portion 28 of the gland body 25, the compression ring 32 being compressed between them with one end seated against the portion 28 of the gland body 25 and the other end seated against the gland nut.

It will be appreciated that with the arrangement above described the sealing pot is clamped during application between the two ends of its base portion 18 which is relatively thick and is not liable to damage, thereby avoiding the disadvantage of many existing tools which in use cause pressure to be applied to the thin walled portion 16 of the sealing pot 17. It will also be realised that the above described tool ensures that the sealing pot 17 is held in correct axial alignment with the cable 27 during its attachment and that this materially assists in the achievement of an efficient end seal.

described the sealing pot is clamped during application

It will be appreciated that the above described arrangement may be modified in various ways within the scope of the invention. For example, the tool may be used for applying a screw-on sealing pot other than of the well known kind above described, and the sleeve forming part of such tool may be secured, during attachment of the sealing pot, to a gland body, such for example as a plain cylindrical sleeve, other than that of the standard type referred to. Again, it will be appreciated that the sleeve may if desired be formed as an integral part of the tool and that when, as in the above-described arrangement, the sleeve is separately formed from the tool body it is important that such separate parts should fit relatively accurately together, and more especially in axial alignment with one another, with a reasonable degree of firmness and rigidity. Finally, it will be clear that the means for enabling the tool body to be rotated may be varied, but that the described arrangement is especially easy to dismantle for packing and transport purposes.

What we claim as our invention and desire to secure by Letters Patent is:

1. A tool for effecting the screw-fitting of a sealing pot to a metal sheathed electric cable over which a gland body is rotatably disposed and from the end of which cable the sheath has been stripped to expose the cable conductor or conductors, said tool comprising a hollow tool body having a central hole at least sufficiently large to permit the cable conductor or conductors to pass therethrough, an annular probe on the tool body having a central hole sufficiently large to permit the cable conductor or conductors to pass therethrough and of insufficient size to permit passage of the cable sheath, rotating means on the tool body for enabling the tool body and probe thereon to be rotated, a sleeve on the tool body surrounding the probe in spaced relationship thereto and of sufficiently large internal diameter to be disposed over the sealing pot during attachment, and securing means at the end portion of the sleeve remote from the tool body for enabling such sleeve to be secured to the gland body, whereby during attachment the sealing pot is clamped between such gland body and the probe and is screwed onto the cable sheath.

2. A tool as claimed in claim 1 in which at least a part of the end face of the probe is tapered at an angle corresponding to that of an internal shoulder on the sealing pot constituting an abutment with which such probe engages.

3. A tool as claimed in claim 1 in which corresponding screwthreads are provided respectively on the sleeve and on the tool body for securing such sleeve and tool body together and the securing means on the end of the sleeve remote from the tool body is a further screwthread for securing such sleeve to a correspondingly screwthreaded gland body.

4. A tool as claimed in claim 1 in which the inner portion of the end face of the probe is recessed by means of a reverse taper.

5. A tool as claimed in claim 1 in which the rotating means for enabling the tool body to be rotated comprises a pair of handles screwed into screwthreaded holes in the tool body.

References Cited in the file of this patent

UNITED STATES PATENTS

| | | |
|---|---|---|
| 1,030,732 | Jenkins | June 25, 1912 |
| 1,642,285 | Woodward | Sept. 13, 1927 |
| 2,487,331 | Greene | Nov. 8, 1949 |